Patented July 6, 1948

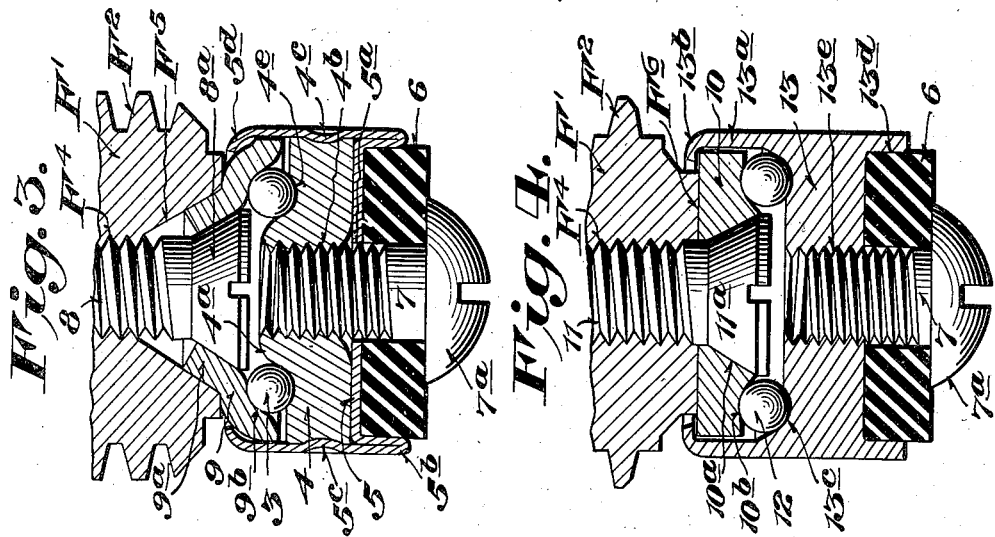
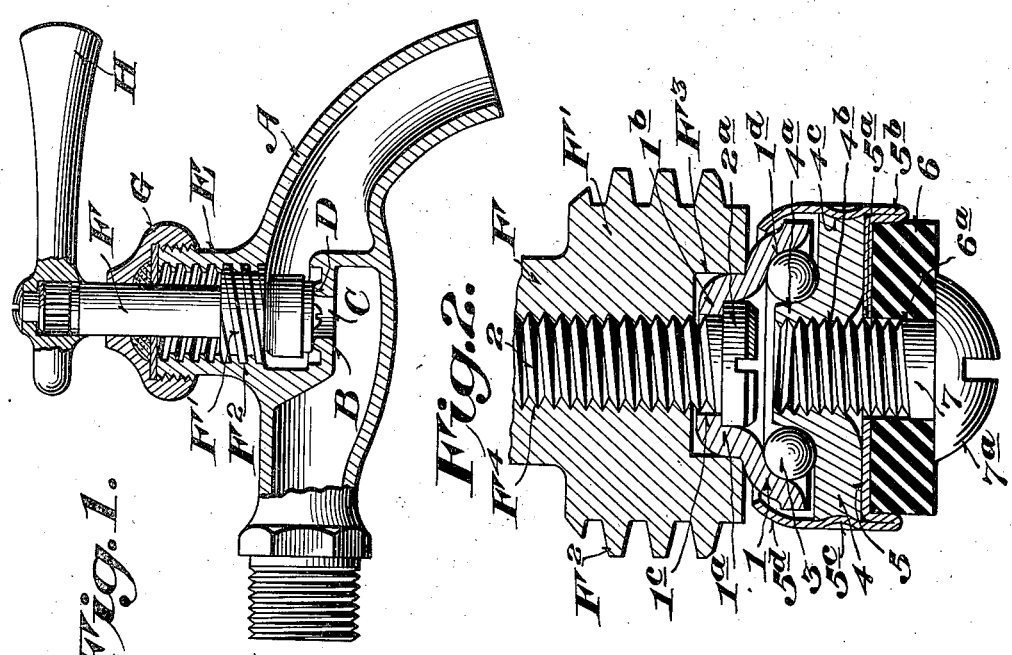

2,444,595

UNITED STATES PATENT OFFICE 2,444,595

WASHER ASSEMBLY UNIT

Raymond S. Doerr and Keith Doerr, Battle Creek, Mich., assignors to H. B. Sherman Manufacturing Co., Battle Creek, Mich., a corporation of Michigan Application March 1, 1945, Serial No. 580,362

2 Claims. (Cl. 251—46)

This invention relates to faucets, bibbs, valves, or the like, and the principal object thereof is to provide a ball-bearing washer assembly unit for ready installation on and removal from the stems of the valves thereof, which unit may be readily and economically manufactured and assembled, eliminating the likelihood of separation of parts.

The principal objects of the invention are to provide a novel ball bearing unit comprising a pair of ball races, balls, and a housing carried by one of said races and extending around and over the other race and having its upper edge crimped over the top of said other race to secure the bearing races together; the provision of a formed seat washer retainer carried by the lower race and having means for retaining the ball races together; the provision of a seat washer screw in the unit attached only to the lower ball race; the provision of an upper ball race of inverted conical shape so mounted in the valve stem that the line of bearing pressure will be directed toward the axis of the unit, effecting self-centering of the balls and the lower race, and the provision of an upper ball race of conical shape engaging a conical recess in the end of the valve stem, whereby the cone-shaped head of the retaining screw will force the conical-shaped upper race into the stem recess and spring load the screw to prevent loosening while in service, thereby eliminating the necessity of providing a lock washer.

We will explain the invention with reference to the accompanying drawing which illustrates several practical embodiments thereof, to enable others familiar with the art to adopt and use the same; and will summarize in the claims the novel features of construction and novel combinations of parts for which protection is desired.

In said drawings:

Fig. 1 is a longitudinal section through a faucet provided with my novel ball-bearing washer assembly unit cooperating with the valve seat.

Fig. 2 is an enlarged section through one form of ball-bearing washer assembly unit.

Fig. 3 is a section through a modified unit.

Fig. 4 is a vertical section through a still further modified unit.

As shown, faucet A is of ordinary construction, having a wall B provided with an opening C surrounded on its upper face with a valve seat D in the usual manner, the faucet having an internally threaded extension E into which the valve stem F is threaded, a suitable packing nut G surrounding the stem, and which stem carrying a handle H, whereby when the handle is rotated, the valve stem F will rise or fall with respect to valve seat D, stem F having an enlarged head $F^1$ at its lower end externally threaded as at $F^2$.

In the modification shown in Fig. 2, the lower end of stem F is provided with a circular recess $F^3$ and with an axially disposed tapped bore $F^4$. The upper ball race 1 is of general conical formation, having its central portion bent or crimped upwardly as at $1^a$ to enter the circular recess $F^3$ in the stem; and the upper end of race 1 is flanged inwardly as at $1^b$ and provided with an axial opening $1^c$ for the reception of the retaining screw 2, the head $2^a$ of which engages the under side of the race 1. As screw 2 is seated the central portion of race 1 is drawn by the head $2^a$ upwardly towards the inner end of recess $F^3$, thus forcing the portion $1^a$ into the stem recess and spring loading screw 2, thereby preventing loosening of the screw 2 during service, the upper end of the central portion of race 1 being slightly spaced from the inner end of recess $F^3$. Preferably the upper race 1 is of relatively rigid material but capable of being flexed under stress of the screw 2 to spring load the screw. The outer portion of upper race 1 flares outwardly under the stem F and has an annular circular groove $1^d$ in its lower face spaced from its outer periphery thereof for the reception of the balls 3.

The lower ball race 4 is disc shaped, having an axial extension $4^a$ on its upper face provided with a threaded bore $4^b$, the corner formed by the upper face of the race 4 and the outer wall of the extension $4^a$ having a rounded fillet corresponding with the curvature of the balls 3, as shown. The outer periphery of the lower race 4 is provided with indentations $4^c$ for the purpose hereinafter described.

A seat washer retainer of sheet metal underlies the bottom of race 4, same comprising a housing having a bottom 5 provided with an axial opening $5^a$ opposite the tapped bore $4^b$ of lower race 4. The periphery of the bottom 5 has a depending annular flange $5^b$ formed by doubling the metal of the disc back upon itself, as shown, the side walls of the housing extending upwardly along the sides of race 4, same having portions $5^c$ pressed into the indentations $4^c$ in the periphery of lower race 4, as indicated in Fig. 2, the upper edges of the side walls of the housing extending above the periphery of the upper ball race 1 and being rolled or peened, as at $5^d$, so as to overlie and substantially contact the upper face of upper race 1 below the head $F^1$, the peened or rolled portion $5^d$ serving to lock the ball races 4 and 1 together while permitting rotation of lower ball race 4 with respect to the upper race 1. Below the bottom plate 5 of the retainer housing is a rubber or fibre washer having a central opening $6^a$; and a screw 7 passes through the openings $6^a$—$5^a$ and is threaded into the tapped bore $4^b$ of the lower ball race 4 terminating below the upper face of race 4, the head $7^a$ of screw 7 seating squarely upon the lower face of washer 6 and being of less diameter than the valve seat D, as shown in Fig. 1.

By the above construction, the seat washer retainer housing has wall portions bent to secure the lower race A to the upper race 1, and the washer 6 and housing are carried directly by the lower ball race 4, the screw 7 having no engagement with the upper race 1.

In assembling the unit shown in Fig. 2, the lower ball race 4 is dropped into the retainer housing, which is initially preformed with straight side walls, then the balls 3 are dropped in upon the race 4; then the upper race 1 with the screw 2 inserted through the central hole $1^c$, is dropped in place in the housing; then the upper edges of the side walls of the housing are rolled or peened over the top of the periphery of the upper race 2 to complete the unit. The lower ball race 4 is held from rotation within the housing by means of the interlocking portions $5^c$—$4^c$ in the lower race and housing, so that the seat washer screw 7 can be screwed into bore $4^b$ while the housing is held against rotation.

The above construction provides a preformed ball seat washer retainer carried by the lower ball race and having clamping means for retaining the ball races together, to prevent the balls from being dislodged and becoming lost from the assembly. One of the chief troubles heretofore experienced in assembling ball-bearing washer units was, that in peening the end of the upper race into the lower race, unless same was precisely done, the ball races would separate, permitting the balls to escape from between the races. However, with the type of construction shown in Fig. 2, the cylindrical housing can be readily crimped over the upper race so that there is practically no possibility of the unit to become so loose that the balls can be lost from between the races or from the housing.

In Fig. 3 a modification is shown in which the lower end of the head $F^1$ of the stem F is provided with a conical recess $F^5$ terminating in the tapped bore $F^4$, the walls of the recess $F^5$ corresponding in angularity to the conical head $8^a$ of the screw 8, as shown. In this modification, the upper ball race 9 is likewise of general conical shape, and the central portion $9^a$ is conically formed and is adapted to be wedged in the conical recess $F^5$ by the conical head $8^a$ of screw 8, while the outer portion flares outwardly over the lower end of head $F^1$ and has an annular circular groove $9^b$ in its lower face for the reception of the balls 3. The retainer housing 5, lower race 4, washer 6, and the screw 7 are otherwise identical with the corresponding parts shown in Fig. 2, and are similarly lettered, and thus require no detailed description herein.

The method of assembly of the unit shown in Fig. 3 is also the same as above described in connection with the unit shown in Fig. 2, the upper sides of the retainer housing being rolled or peened as at $5^d$ over the top of the upper ball race 9 to lock the races together. In this modification, the lower ball race 4 may be provided on its upper face with a circular annular recess $4^e$ for the reception of the balls 3 to reduce the overall height of the unit. However, if desired, the ball race 4 in Fig. 3 may be formed identically the same as that in Fig. 2. Since the upper ball race 9 is of inverted conical shape, the line of bearing pressure is directed toward the axis of the unit, with the result that the lower race 4 will be self-centering.

In the modification shown in Fig. 4, the head $F^1$ of the stem F is provided only with a tapped bore $F^4$, and the lower end of the stem is somewhat reduced in diameter, as at $F^6$. In this modification, the upper ball race 10 is in the form of a relatively thick disc of diameter somewhat larger than the lower reduced end $F^6$ of stem $F^1$, as shown, and race 10 is provided with a countersunk bore $10^a$ receiving the conical head $11^a$ of the screw 11, which secures upper race 10 directly to stem $F^1$. The lower face of the race 10 is provided with an annular circular groove $10^b$ for the reception of the balls 12.

In this modification (Fig. 4), the lower race also serves as the seat washer retainer and the race clamping means or housing, and consists of a body 13 of substantial thickness having an annular flange $13^a$ extending from its upper periphery, embracing the sides of upper race 10, the upper edges of the flange $13^a$ in the finished unit being rolled or peened as at $13^b$ over the upper face of upper race 10, to lock the lower race 13 to the upper race while permitting rotation of the lower race thereon. In the upper face of body 13 within the flange $13^a$ is an annular groove $13^c$ for the reception of the balls 12. At the lower end of race 13 is an annular depending flange $13^d$ within which is seated the washer 6 retained by the head $7^a$ of the screw 7, which is threaded into the tapped bore $13^e$ of the lower race, as in the preceding modifications.

In this modification, Fig. 4, the lower race therefore serves not only as a washer seat but also as the retaining means for maintaining the races 13 and 10 in proper assembly, whereby loss of the balls from between the races is effectively prevented. The method of assembly of the parts shown in Fig. 4 is substantially the same as described in connection with the preceding figures.

It is obvious that in each of the modifications when it is desired to remove or attach the unit with respect to the stem $F^1$, it is merely necessary to first remove the screw $7^a$ and washer 6 in order that a screw driver may be inserted through the central bore $4^b$, or $13^e$ of the lower race 4 or 13 and engaged with the slotted head of the screw 2, 8, or 11, to rotate the latter into or out of position in the head $F^1$ of the stem. Thereafter, the washer 6 and the screw 7 may be replaced in position shown on the lower race 4, or 13. Thus the units are readily replaceable or removable from the stem, permitting quick servicing of the parts when and if necessary.

We do not limit our invention to the exact forms shown in the drawing, for obviously changes may be made therein within the scope of the claims.

We claim:

1. A washer assembly unit, comprising an antifriction bearing having a first race provided with a bore, and a second race carrying a washer, a housing on said second race embracing the first race for maintaining the said races in operative relation while permitting rotation of the second race on the first race, said housing being formed integrally with said second race and surrounding the first mentioned race and having inturned upper edges closely overlying the first mentioned race.

2. A washer assembly unit, comprising an antifriction bearing having one race provided with a bore, and its other race carrying a washer, a housing on one of said races embracing the other race for maintaining the said races in operative relation while permitting rotation of the second race on the first race, said housing surrounding the first mentioned race and having inturned upper edges closely overlying the first mentioned race.

RAYMOND S. DOERR.
KEITH DOERR.

REFERENCES CITED

The following references are of record in the file of this patent:

UNITED STATES PATENTS

| Number | Name | Date |
|---|---|---|
| 137,251 | Sheldon | Mar. 25, 1873 |
| 2,203,684 | Hare | June 11, 1940 |
| 2,204,355 | Hare | June 11, 1940 |
| 2,274,419 | Katcher | Feb. 24, 1942 |
| 2,281,689 | Hare | May 5, 1942 |

FOREIGN PATENTS

| Number | Country | Date |
|---|---|---|
| 395,869 | Germany | 1924 |